(No Model.)
A. J. CONLEY.
HOSE OR PIPE COUPLING.
No. 537,439. Patented Apr. 16, 1895.
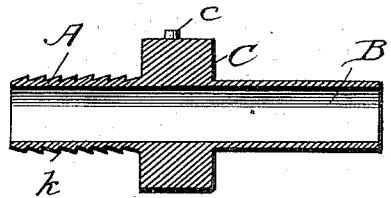
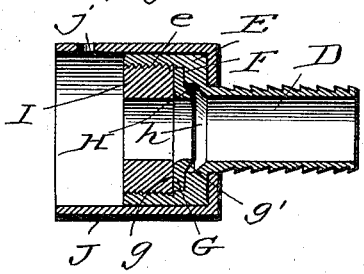
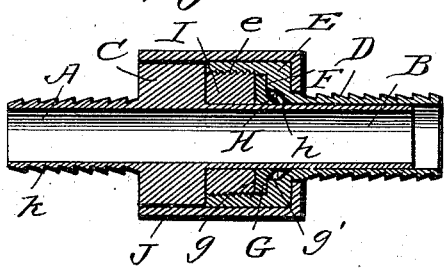
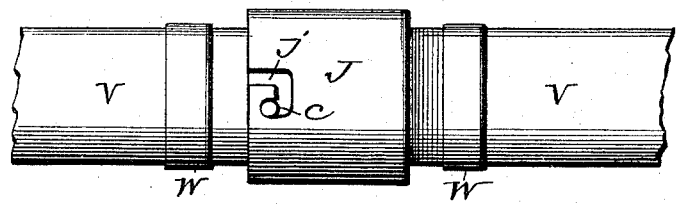
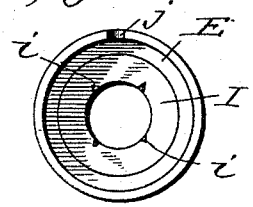
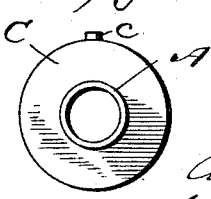
Witnesses
Inventor
Andrew J. Conley
by Woodbury Lowery
his Attorney

UNITED STATES PATENT OFFICE.

ANDREW J. CONLEY, OF LULING, TEXAS.

HOSE OR PIPE COUPLING.

SPECIFICATION forming part of Letters Patent No. 537,439, dated April 16, 1895.

Application filed June 15, 1894. Serial No. 514,634. (No model.)

*To all whom it may concern:*

Be it known that I, ANDREW J. CONLEY, a citizen of the United States, residing at Luling, in the county of Caldwell and State of Texas, have invented new and useful Improvements in Hose or Pipe Couplings, of which the following is a specification.

My invention relates to improvements in detachable pipe or hose couplings in which the section ends when coupled are held together by a bayonet joint, and the object of my invention is to provide a coupling of great simplicity of construction forming a tight and efficient connection by which the hose can be connected without turning it, without the screwing together of the sections and without a loose washer within one of the couplings which is readily lost and quickly gets out of order.

To attain this object my invention consists of a male coupling having a neck to which the hose is attached, a projecting part, and a jam collar rigidly mounted thereon, and a female coupling having a neck terminating in an enlarged tubular head, containing a jam nut and washer through which the port of the male coupling passes when connected, and a rotatable sleeve, mounted thereon and inclosing both the enlarged tubular head, and the collar of the male part when coupled, and having a slot forming a bayonet joint with a pin on the collar to hold the couplings together. An interior chamber within the female coupling on one side of the washer is so disposed, that the greater the rearward pressure of the water in passing through the coupling, the tighter the joint becomes.

In the accompanying drawings, which illustrate my invention, Figure 1 is a longitudinal cross-section of the male coupling, and Fig. 2 is a similar view of the female coupling. Fig. 3 is a longitudinal cross section of the parts coupled; and Fig. 4 is an exterior view of the same, with hose attached. Fig. 5 is an end view of the head of the female coupling; and Fig. 6 is a similar view of the male coupling.

A Figs. 1 and 3 is the tubular neck and B the port of the male coupling.

C is a cylindrical jam collar rigidly mounted on the neck and having a pin $c$ for the purpose of locking the sections together as hereinafter described.

D, Figs. 2 and 3, is the tubular neck of the female coupling. E is its enlarged cylindrical tubular head of the same diameter as the jam collar C of the male coupling. It is screw threaded interiorly at $e$, and has at the bottom a seat F for the ring-shaped washer or gasket G.

H is a circular chamber at the bottom of the enlarged tubular head E concentric with and of somewhat larger diameter than the neck D, with which it communicates through the conical mouth $h$ of the neck.

The ring-shaped gasket G of leather, rubber or other suitable material consists of the flat exterior rim $g$ which fits in the seat F of the enlarged tubular head and the interior conical rim $g'$ which projects into the chamber H without however filling it.

I, is a nut which holds the gasket G permanently in place when screwed home within the enlarged tubular head E of the female coupling. $i\ i$ are notches in the nut to receive a key for the purpose of inserting and withdrawing it, when the gasket is to be changed. The central aperture through the nut and gasket is sufficient to fit snugly around the port B of the male coupling, which also projects into the neck D of the female coupling when the two are connected.

J is a sleeve or casing rotatably mounted over the enlarged tubular head E of the female coupling and extending sufficiently beyond it to receive and inclose the jam collar C of the male coupling when its part B has been inserted through the nut, washer, and into the neck of the female coupling.

$j$ is a slot in the sleeve J forming a bayonet joint with the pin $c$ on the jam collar to hold the couplings together, when connected.

The necks A and D of the coupling sections are corrugated or notched as at $k$ to receive and hold the ends of the hose V (Fig. 4), which are firmly clamped to the necks by means of the bands W.

The operation of my invention is as follows: The part B of the male coupling is inserted into the female coupling, until the jam collar C bears against the face of the enlarged tubular head E, whereupon the two are locked together by means of the bayonet joint. On admitting the water through the coupling the space around the part B and the chamber H becomes filled with water, whereupon any back pressure exerted upon the water, or upon the air contained in the chamber, if it has not all escaped, is expended upon the conical rim of the gasket pressing it closer around the port and tending to make the joint all the tighter, as the washer is supported through its outer surface by the nut.

While I have shown the neck of the female coupling integral with its tubular head, which is my preferred form, I do not limit myself to the same, as the neck and head may be connected in any well known way. Neither do I limit myself to the use of my particular sleeve and bayonet joint as it is evident that the means for locking the two parts together may be greatly varied without departing from the spirit of my invention.

I thus provide a simple, secure and tight coupling with the employment of but a single nut, in which the washer or gasket is permanently held in place without danger of loosening or falling out, and in which an efficient connection is made without the necessity of turning or twisting the hose, whatever the position it may occupy; a connection which becomes the tighter the greater the pressure of water passing through it, and one in which the parts forming the connection are all contained within an integral part of the female coupling and securely retained in place.

Having thus described my invention, what I claim as new, and desire to secure by Letters Patent, is—

1. In a detachable hose coupling, the combination of the male coupling consisting of the male part having a neck to which the hose is secured and a cylindrical jam collar mounted thereon between the port and neck, the female coupling consisting of a neck to which the hose is secured terminating in an enlarged tubular head of the same diameter as the jam collar interiorly screw threaded, a gasket seat at the bottom of said tubular head, the cylindrical and conical chamber at the bottom of said tubular head concentric and communicating with the neck, the gasket seated in said seat having the exterior flat rim and inner conical rim projecting into said chamber, the jam nut screwing into said tubular head and against said gasket, and a locking device for locking the male and female couplings together, when connected, substantially as described.

2. In a detachable hose coupling, the combination of the male coupling consisting of the male part having a neck to which the hose is secured, a cylindrical jam collar mounted thereon between said neck and male part and a pin on the periphery of said collar, and the female coupling consisting of a neck to which the hose is secured, terminating in an enlarged tubular head of the same diameter as the jam collar interiorly screw threaded, a gasket seat at the bottom of said tubular head, the cylindrical and conical chamber at the bottom of said tubular head concentric and communicating with the neck, the gasket seated in said seat having the exterior flat rim and inner conical rim projecting into said chamber, the jam nut screwing into said tubular head and against said gasket, and the revoluble cylindrical sleeve or casing mounted on the neck of said coupling and inclosing the tubular head and having a slot in its rim which engages and locks with the pin on the jam collar, when the couplings are connected, substantially as described.

In testimony whereof I have hereunto set my hand in the presence of two subscribing witnesses.

ANDREW J. CONLEY.

Witnesses:
W. R. HYMAN,
J. M. WALKER.